United States Patent
Li et al.

(10) Patent No.: US 11,083,039 B2
(45) Date of Patent: Aug. 3, 2021

(54) MOBILE NETWORK OPTIMIZATION PROCESSING METHOD, DEVICE, AND SYSTEM

(71) Applicant: HUAWEI TECHNOLOGIES CO., LTD., Shenzhen (CN)

(72) Inventors: Meng Li, Beijing (CN); Zhenglei Huang, Beijing (CN); Qiang Deng, Shenzhen (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/529,828

(22) Filed: Aug. 2, 2019

(65) Prior Publication Data

US 2019/0357298 A1     Nov. 21, 2019

Related U.S. Application Data

(63) Continuation of application No. PCT/CN2017/108700, filed on Oct. 31, 2017.

(30) Foreign Application Priority Data

Feb. 4, 2017    (WO) ................ PCT/CN2017/072908

(51) Int. Cl.
| | | |
|---|---|---|
| *H04W 24/00* | (2009.01) | |
| *H04W 76/27* | (2018.01) | |
| *H04W 24/02* | (2009.01) | |
| *H04W 64/00* | (2009.01) | |

(52) U.S. Cl.
CPC .......... *H04W 76/27* (2018.02); *H04W 24/02* (2013.01); *H04W 64/006* (2013.01)

(58) Field of Classification Search
CPC ..... H04L 43/12; H04L 41/12; H04L 12/1407; H04L 41/0893; H04L 41/5009; H04L 41/5025; H04L 41/14; H04L 43/04; H04L 43/062; H04L 43/0876; H04W 24/02; H04W 24/08; H04W 24/10; H04W 48/18; H04W 28/0268
See application file for complete search history.

(56) References Cited

U.S. PATENT DOCUMENTS

| | | | |
|---|---|---|---|
| 9,107,123 B2 | 8/2015 | Wang et al. | |
| 2010/0302957 A1* | 12/2010 | Ketheesan | .......... H04L 41/0893 370/252 |
| 2013/0316713 A1 | 11/2013 | Xu et al. | |

(Continued)

FOREIGN PATENT DOCUMENTS

| | | | |
|---|---|---|---|
| CN | 101466147 A | 6/2009 | |
| CN | 102045834 A | 5/2011 | |

(Continued)

*Primary Examiner* — Khalid W Shaheed
(74) *Attorney, Agent, or Firm* — Hauptman Ham, LLP

(57) ABSTRACT

Embodiments of this application provide a plurality of mobile network optimization processing methods, devices, and systems. Joint optimization is performed at an application layer and a communications layer, and information provided by the application layer is used to instruct UE to perform proper state transition, to optimize a state transition process of the UE, and reduce resource consumption caused during state transition of the UE.

19 Claims, 8 Drawing Sheets

(56) References Cited

U.S. PATENT DOCUMENTS

| | | | |
|---|---|---|---|
| 2015/0023161 A1* | 1/2015 | Alisawi | H04W 76/10 370/230 |
| 2015/0087313 A1 | 3/2015 | Kim et al. | |
| 2015/0118993 A1 | 4/2015 | Rune et al. | |
| 2015/0230130 A1* | 8/2015 | Luna | H04L 43/062 370/235 |
| 2015/0282082 A1 | 10/2015 | Landais et al. | |
| 2017/0188184 A1* | 6/2017 | Acharya | H04W 52/0209 |
| 2017/0347283 A1* | 11/2017 | Kodaypak | H04W 4/70 |
| 2019/0159055 A1* | 5/2019 | Klatt | H04W 24/10 |

FOREIGN PATENT DOCUMENTS

| | | |
|---|---|---|
| CN | 102769840 A | 11/2012 |
| CN | 104066134 A | 9/2014 |
| CN | 104272777 A | 1/2015 |
| CN | 105050124 A | 11/2015 |
| CN | 105183800 A | 12/2015 |
| CN | 106162745 A | 11/2016 |
| EP | 2854472 A1 | 4/2015 |
| WO | 9933305 A2 | 7/1999 |
| WO | 2013167800 A1 | 11/2013 |

\* cited by examiner

MOBILE NETWORK OPTIMIZATION PROCESSING METHOD, DEVICE, AND SYSTEM

CROSS-REFERENCE TO RELATED APPLICATIONS

This application is a continuation of International Application No. PCT/CN2017/108700, filed on Oct. 31, 2017, which claims priority to International Application No. PCT/CN2017/072908, filed on Feb. 4, 2017. The disclosures of the aforementioned applications are hereby incorporated by reference in their entireties.

TECHNICAL FIELD

Embodiments of this application relate to communications technologies, and in particular, to a mobile network optimization processing method, device, and system.

BACKGROUND

With continuous development of mobile communications technologies, to consider both user experience and network resource utilization, mobile network optimization becomes increasingly important. Mobile network optimization is mainly improving radio resource utilization, for example, controlling allocation and signaling of an air interface resource used for data transmission between UE (user equipment) and an access node of a radio access network (RAN), and reducing power consumption of the UE.

Because the UE has features such as a location change and limited power, in the prior art, network optimization can be implemented by controlling state transition of the UE. For example, when no data needs to be transmitted, the UE in a connected mode releases an air interface connection, and deletes a context of the UE from a base station, so that the UE is in an idle mode. When the UE in the idle mode needs to transmit data, the UE triggers a service request process to request a network side to restore an air interface connection of the UE. In this way, invalid occupation of an air interface resource can be avoided, and radio resource utilization can be improved. In addition, the UE in the idle mode can consume less power than the UE in the connected mode, to reduce power consumption of the UE.

However, an existing condition of triggering transition of the UE from the connected mode to the idle mode is as follows: The UE transmits no data within 10 seconds to 30 seconds (specific duration is set by an operator). If the UE really does not need to transmit data, the UE being in the connected mode in this period of time is meaningless, and it can be learned that a power waste still occurs. In addition, when the UE in the idle mode needs to transmit data, and needs to be transitioned to the connected mode, a service request process is triggered by a network side. The UE can transmit the data only after a connection is established between an evolved NodeB (eNB) and a core network side (an MME, an S-GW, or the like), and establishment of an air interface connection (between the UE and the eNB) is completed, which causes a relatively high latency. In addition, the UE may move out of coverage of an original cell due to mobility of the UE. In this case, the network side needs to page all evolved NodeBs (eNB) in a tracking area list (TA List), which causes extra paging signaling consumption, and consequently wastes signaling resources.

SUMMARY

Embodiments of this application provide a plurality of mobile network optimization processing methods, devices, and systems. Joint optimization is performed at an application layer and a communications layer, and based on a big data analysis function network element in an operator network, a data analysis result provided by the application layer is used to instruct the UE to perform proper state transition, so as to resolve all or at least some of the foregoing technical problems.

According to a first aspect, an embodiment of this application provides a mobile network optimization processing method. The method is performed by an NWDA function entity, and the method includes:

obtaining, by a network data analytics (NetWork Data Analytics, NWDA) function entity, first information, where the first information includes at least one of the following: location information of UE, moving track information of the UE, historical location statistics of the UE, and service information of the UE;

determining, by the NWDA function entity, second information based on the first information, where the second information includes at least one of the following: location information of the UE at a preset time point or in a preset time period, time information for performing optimization processing on the UE, and indication information for performing optimization processing on the UE; and sending, by the NWDA function entity, a first message to a control plane function entity, where the first message carries the second information, so that the control plane function entity performs optimization processing on the UE based on the first message.

According to the mobile network optimization processing method provided above, joint optimization is performed at an application layer and a communications layer, and information provided by the application layer is used to instruct the UE to perform proper state transition, to optimize a state transition process of the UE, and reduce resource consumption caused during state transition of the UE.

In a possible design, the obtaining, by an NWDA function entity, first information includes at least one of the following operations: obtaining, by the NWDA function entity, the first information reported by the UE; obtaining, by the NWDA function entity, the first information reported by an access network AN; obtaining, by the NWDA function entity, the first information reported by an application function AF entity; and obtaining, by the NWDA function entity, the first information reported by a network function NF entity.

Optionally, the time information for performing optimization processing on the UE includes: a time at which the UE enters an idle mode; or a time at which the UE enters a connected mode; or a time of establishing a service that causes a state change of the UE; or a time of ending a service that causes a state change of the UE.

Optionally, the indication information for performing optimization processing on the UE includes: an indication that the UE enters an idle mode; or an indication that the UE enters a connected mode; or an indication of establishing a service that causes a state change of the UE; or an indication of ending a service that causes a state change of the UE.

Optionally, optimization assistance information of the UE includes the location information and the moving track information of the UE, the determining, by the NWDA function entity, second information based on the first information includes: determining, by the NWDA function entity, the location information of the UE at the preset time point or in the preset time period based on the location information and the moving track information that are of the UE.

Optionally, the first information includes the service information of the UE, and the determining, by the NWDA function entity, second information based on the first information includes: determining, by the NWDA function entity based on the service information of the UE, the time information for performing optimization processing on the UE.

In a possible design, before the determining, by the NWDA function entity, second information based on the first information, the method further includes: receiving, by the NWDA function entity, current state information of the UE that is sent by the control plane function entity, where the state information includes the connected mode or the idle mode.

According to the mobile network optimization processing method provided in the foregoing possible designs, the NWDA function entity notifies the control plane function entity of information that is used for performing optimization processing on the UE and that is obtained by analyzing application layer information of the UE (the optimization assistance information of the UE), so that the control plane function entity performs optimization processing on the UE based on the information for performing optimization processing on the UE. In other words, information provided by an application layer may be used to instruct the UE to perform proper state transition, to optimize a state transition process of the UE, and reduce resource consumption caused during state transition of the UE.

According to a second aspect, an embodiment of this application provides a mobile network optimization processing method. The method is performed by a control plane function entity, and the method includes:

receiving, by a control plane function entity, a first message that is sent by an NWDA function entity and that carries second information, where the second information includes at least one of the following: location information of the UE at a preset time point or in a preset time period, time information for performing optimization processing on the UE, and indication information for performing optimization processing on the UE; the second information is obtained by the NWDA function entity based on first information; and the first information includes at least one of the following: location information of the UE, moving track information of the UE, historical location statistics of the UE, and service information of the UE; and performing, by the control plane function entity, optimization processing on the UE based on the first message.

According to the mobile network optimization processing method provided above, joint optimization is performed at an application layer and a communications layer, and information provided by the application layer is used to instruct the UE to perform proper state transition, to optimize a state transition process of the UE, and reduce resource consumption caused during state transition of the UE.

Optionally, the time information for performing optimization processing on the UE includes: a time at which the UE enters an idle mode; or a time at which the UE enters a connected mode; or a time of establishing a service that causes a state change of the UE; or a time of ending a service that causes a state change of the UE.

Optionally, the indication information for performing optimization processing on the UE includes: an indication that the UE enters an idle mode; or an indication that the UE enters a connected mode; or an indication of establishing a service that causes a state change of the UE; or an indication of ending a service that causes a state change of the UE.

In a possible design, the performing, by the control plane function entity, optimization processing on the UE based on the first message includes: determining, by the control plane function entity, that the UE needs to be transitioned to the idle mode, and sending, by the control plane function entity, a connection release request to an access network based on the second information, to request to release a connection of the UE; or determining, by the control plane function entity, that the UE needs to be transitioned to the connected mode, and sending, by the control plane function entity, a paging message to an access network based on the second information, to request to establish a connection of the UE; or determining, by the control plane function entity, that the UE needs to activate a session, and triggering, by the control plane function entity, a session activation procedure based on the second information.

In a possible design, the second information includes the location information of the UE at the preset time point or in the preset time period, and the performing, by the control plane function entity, optimization processing on the UE based on the first message includes: determining, by the control plane function entity at the preset time point or in the preset time period, a paging range of the UE based on the location information of the UE at the preset time point or in the preset time period; and sending, by the control plane function entity, a paging message to an access network in the determined paging range, to request to establish a connection of the UE.

In a possible design, before the receiving, by a control plane function entity, a first message that is sent by an NWDA function entity and that carries second information, the method further includes: sending, by the control plane function entity, current state information of the UE to the NWDA function entity, where the state information includes the connected mode or the idle mode.

According to the mobile network optimization processing method provided in the foregoing possible designs, the control plane function entity obtains the second information by analyzing UE-based application layer information (namely, the first information) sent by the NWDA function entity, and performs optimization processing on the UE. Information provided by an application layer may be used to instruct the UE to perform proper state transition, to optimize a state transition process of the UE, and reduce resource consumption caused during state transition of the UE.

According to a third aspect, to implement the mobile network optimization processing method provided in the first aspect, an embodiment of this application provides a mobile network optimization processing apparatus, and the apparatus has a function of implementing the foregoing mobile network optimization processing method. The function may be implemented by hardware, or may be implemented by hardware executing corresponding software. The hardware or the software includes one or more modules corresponding to the function.

In a possible implementation of the third aspect, the apparatus includes a plurality of function modules or units, configured to implement any mobile network optimization processing method according to the first aspect.

According to a fourth aspect, an embodiment of this application provides an NWDA function entity, and a structure of the NWDA function entity may include a processor and a transceiver. The processor is configured to support the NWDA function entity in performing a corresponding function in any mobile network optimization processing method according to the first aspect. The transceiver is configured to support communication between the NWDA function entity and another network device, and may be, for example, a corresponding radio frequency module or baseband module.

The NWDA function entity may further include a memory. The memory is configured to be coupled to the processor, and stores a program instruction and data that are necessary for the NWDA function entity to perform the foregoing mobile network optimization processing methods.

According to a fifth aspect, an embodiment of this application provides a computer storage medium, configured to store a computer software instruction used by the foregoing NWDA function entity. The computer storage medium includes a program designed for executing the first aspect.

According to a sixth aspect, an embodiment of this application provides a computer program product, including an instruction. When the computer program is executed by a computer, the instruction enables the computer to perform a function performed by the NWDA function entity in the foregoing methods.

According to a seventh aspect, to implement the mobile network optimization processing method provided in the second aspect, an embodiment of this application provides a mobile network optimization processing apparatus, and the apparatus has a function of implementing the foregoing mobile network optimization processing method. The function may be implemented by hardware, or may be implemented by hardware executing corresponding software. The hardware or the software includes one or more modules corresponding to the function.

In a possible implementation of the seventh aspect, the apparatus includes a plurality of function modules or units, configured to implement any mobile network optimization processing method according to the first aspect.

According to an eighth aspect, an embodiment of this application provides a control plane function entity, and a structure of the control plane function entity may include a processor and a transceiver. The processor is configured to support the control plane function entity in performing a corresponding function in any mobile network optimization processing method according to the second aspect. The transceiver is configured to support communication between the control plane function entity and another network device, and may be, for example, a corresponding radio frequency module or baseband module. The control plane function entity may further include a memory. The memory is configured to be coupled to the processor, and stores a program instruction and data that are necessary for the control plane function entity to perform the foregoing mobile network optimization processing method.

According to a ninth aspect, an embodiment of this application provides a computer storage medium, configured to store a computer software instruction used by the control plane function entity, and the computer storage medium includes a program designed for performing the second aspect.

According to a tenth aspect, an embodiment of this application provides a computer program product, including an instruction. When the computer program is executed by a computer, the instruction enables the computer to perform a function performed by the control plane function entity in the foregoing methods.

According to an eleventh aspect, an embodiment of this application provides a mobile network optimization processing system, including UE, an NWDA function entity having the mobile network optimization processing apparatus provided in the third aspect, and a control plane function entity having the mobile network optimization processing apparatus provided in the seventh aspect.

According to a twelfth aspect, an embodiment of this application provides a mobile network optimization processing system, including UE, the NWDA function entity according to the fourth aspect, and the control plane function entity provided in the eighth aspect.

In comparison with the prior art, according to the method, the device, and the system provided in the embodiments of this application, joint optimization may be performed at an application layer and a communications layer, and information provided by the application layer may be used to instruct the UE to perform proper state transition, so as to resolve all or at least some of prior-art problems in a state transition process of the UE. This is specifically reflected in at least one of the following aspects:

(1) Before the UE needs to transmit data, the UE in the idle mode is transitioned to the connected mode in advance based on the application layer information of the UE, without waiting for a service request process triggered by a network side, thereby reducing a latency;

(2) Based on the application layer information of the UE, the UE is directly and quickly transitioned to the idle mode, without waiting for a waiting time of 10 seconds to 30 seconds specified in a network, thereby reducing power consumption of the UE, avoiding ineffective occupation of an air interface resource, and improving radio resource utilization;

(3) When the UE in the idle mode is transitioned to the connected mode, information about a location of the UE when the UE is paged may be predicted based on the application layer information of the UE, to reduce a paging range of the UE, thereby reducing signaling overheads during paging.

DESCRIPTION OF EMBODIMENTS

The technical solutions provided in the embodiments of this application are applicable to a mobile network. The mobile network in the embodiments of this application is a combination of different types of mobile network elements, different transmission networks, and different network management subsystems. The different types of mobile network elements, such as a base station (Base Transceiver Station, BTS), a controller, and a core network (Core Network, CN), perform different network functions. The transmission network is used to connect mobile network elements, and the network management subsystem is used to manage the mobile network elements and the transmission network.

UE in the embodiments of this application is mainly a portable lightweight mobile terminal such as a smartphone, a tablet, or a PAD. The mobile network and the mobile terminal are interconnected by using a radio interface, and the radio interface may use a plurality of radio technologies. It should be noted that, in the embodiments of this application, the radio technologies that can be used by the radio interface include a 4th generation mobile communications technology (4G), or may be a currently studied 5G mobile communications technology (5G) or even another mobile communications technology that is to be studied subsequently.

Figure 1:
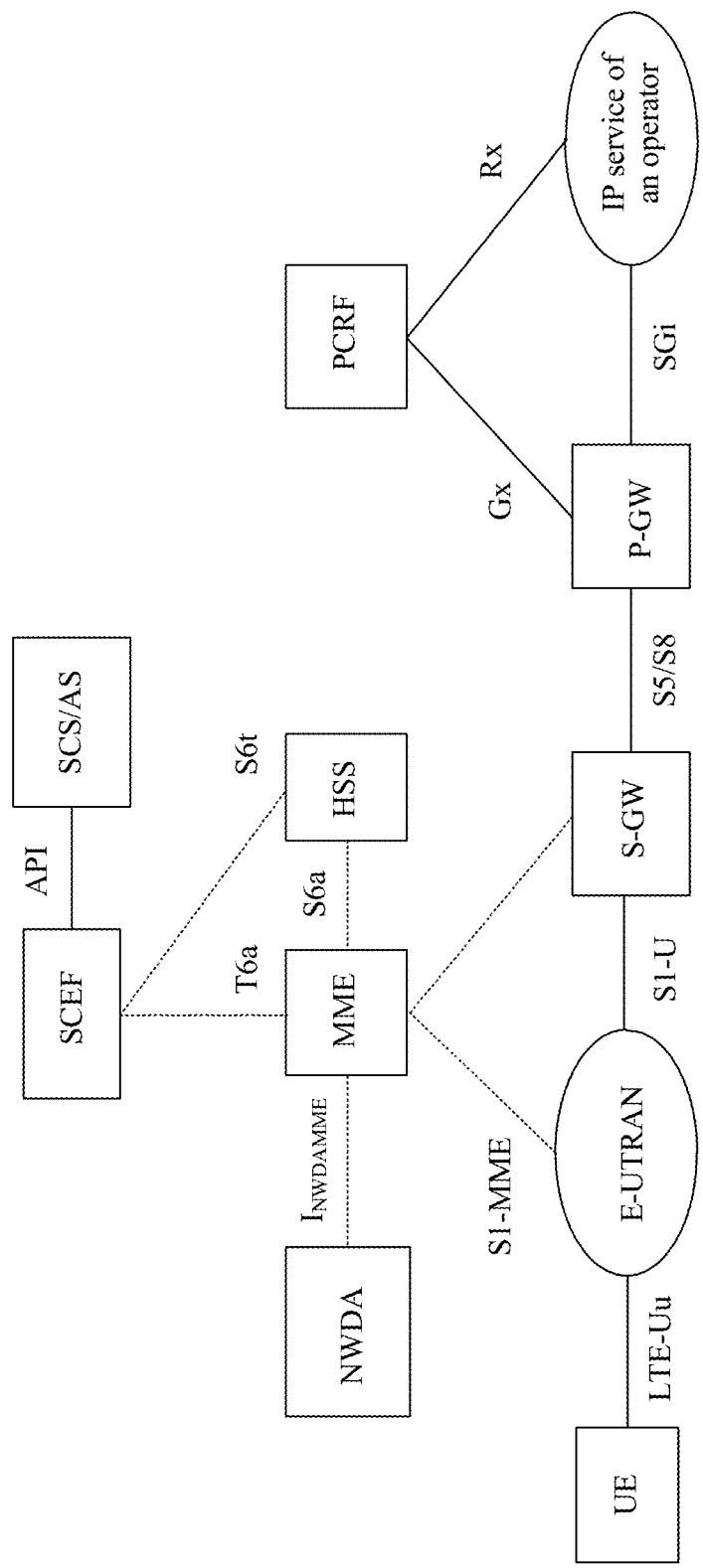
FIG. 1 is a schematic diagram of an application scenario of a mobile network optimization processing method according to an embodiment of this application.
Figure 2:
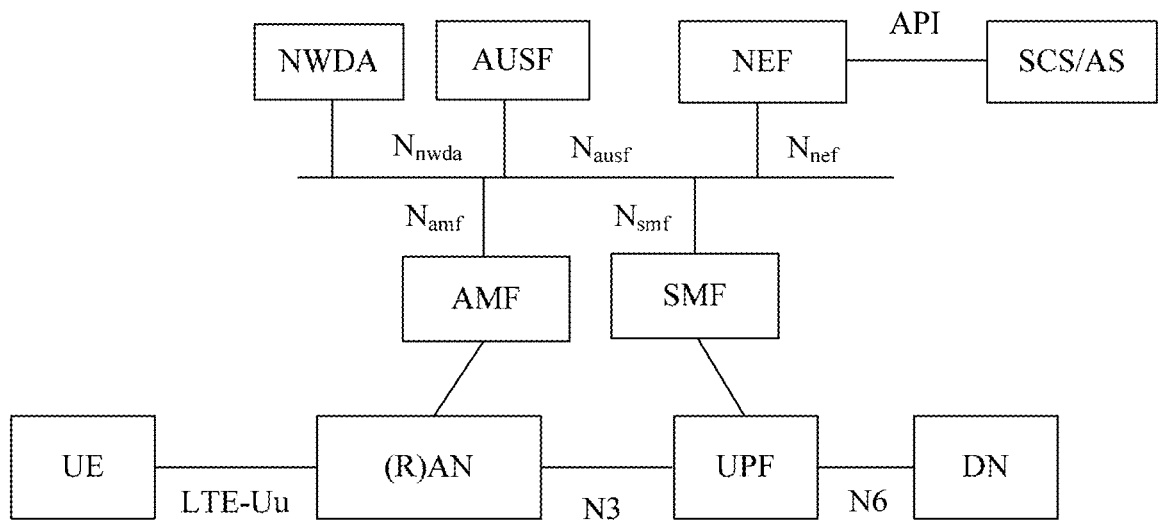
FIG. 2 is a schematic diagram of another application scenario of a mobile network optimization processing method according to an embodiment of this application.

In some embodiments of this application, a 3rd generation partnership project (3rd Generation Partnership Project, 3GPP) system shown in FIG. 1 is used as an example to describe an application scenario of this application. FIG. 1 is a schematic diagram of an application scenario of a mobile network optimization processing method according to an embodiment of this application. In some embodiments of this application, a 3GPP system shown in FIG. 2 is used as an example to describe an application scenario of this application. FIG. 2 is a schematic diagram of another application scenario of a mobile network optimization processing method according to an embodiment of this application. As shown in FIG. 1 and FIG. 2, logical function units in the system architecture mainly include:

(1) Service capability server/application server (SCS/AS), configured to implement related service logic, and provide application layer information for a user;

(2) Service capability exposure function (SCEF) entity, configured to provide the following functions: authentication and authorization; supporting an external entity in discovering a network; functions related to policy execution, inter-operator accounting, and interconnecting with an external entity; and the like;

(3) Mobility management entity (MME), which is configured to manage a control plane of a core network, and is mainly responsible for mobility management, session management, access control, network element selection, storing a user context, and the like;

(4) NWDA function entity, configured to: collect and store information from UE, an (R)AN, and another network entity, analyze the information, generate context information (which may be considered as application layer information) of a user, and distribute the application layer information;

(5) Home subscriber server (HSS), which is configured to store user subscription information, and is mainly responsible for managing subscription data of a user and location information of a mobile user;

(6) Evolved universal terrestrial radio access network (E-UTRAN), which includes an evolved NodeB (eNB), provides a radio resource for terminal access, and may provide a higher uplink-downlink rate, a lower transmission latency, and more reliable radio transmission;

(7) Serving gateway (S-GW), which is a user plane entity, is responsible for routing processing of user plane data, buffering downlink data of UE in an idle mode, and managing and storing a system architecture evolution (System Architecture Evolution, SAE) bearer context of the UE, and is an internal user plane anchor in a 3GPP system.

(8) Packet data network gateway (P-GW), which is responsible for connecting UE to a packet data network (PDN) and allocating an IP address of a user, and is a mobility anchor in both a 3GPP access system and a non-3GPP access system;

(9) Policy and charging rules function (PCRF) entity, where the function entity includes a policy control decision function and a flow-based charging control function;

(10) Network exposure function (NEF) entity, configured to securely expose, to the outside, a service, a capability, and the like that are provided by a 3GPP network function;

(11) Access management function (AMF) entity, which serves as a control plane termination point of a radio access network and a termination point of non-access signaling, and is responsible for mobility management, lawful interception, access authorization/authentication, and the like;

(12) Session management function (SMF) entity, which is mainly responsible for session management, UE internet protocol (IP) address allocation and management, selection of a manageable user plane, and downlink data notification, and serves as a termination point of a policy control and charging function interface, and the like.

(13) User plane function (UPF) entity, which is mainly responsible for packet routing and transfer, quality of service (QoS) processing of user plane data, and the like;

(14) (Radio) access network ((R)AN), which provides a network resource for terminal access;

(15) Authentication server function (AUSF) entity, which is mainly responsible for user authentication and the like.

(16) Data network (DN), which is a network used to transmit data, for example, an Internet network.

It may be understood that, in some possible designs, the logical function units in the system architecture may further include:

Network function (NF) entity, which is a more general description of network function entities, for example, network function entities such as an AMF entity, an SMF entity, and a policy and charging function (PCF) entity each may be referred to as NFs;

Control plane function (CPF) entity, which mainly performs access control and mobility management functions (for example, an AMF) such as authentication, encryption, and location registration of UE, and a session management function (for example, functions of an SMF) such as establishment, release, and change of a user plane transmission path, where for ease of understanding, it may be considered that the CPF is a set of network elements such as an AMF entity, an SMF entity, and a PCF entity;

Application function (AF) entity, which interacts with a 3GPP core network element, and provides functions such as influenced routing decision, access to an exposed network capability, and interacting with a policy framework to provide policy control.

Data collected in the NWDA function entity may be applied to a communications network. The data in the NWDA function entity is sent to the MME or the AMF entity and the SMF entity by using a related interface (an interface $I_{NWDA/MME}$ in the application scenario shown in FIG. 1 or an interface $N_{nwda}$ in the application scenario shown in FIG. 2), to perform network-related control and optimization. It should be understood that, in FIG. 1, the interface $I_{NWDAMME}$ that connects the NWDA function entity and the MME is a representation of a connection interface between the NWDA function entity and the MME. The interface and the network element are not defined temporarily in the standard. It should also be understood that FIG. 2 shows a network architecture from a perspective of a service-based interface, and a case in which the network architecture is described from a point-to-point perspective is similar to this. Details are not described herein again.

The data in the NWDA function entity may have the following several sources:

1. The data may be data directly reported by UE, for example, GPS location information of the UE. An interface between the UE and the NWDA function entity is not shown in the figure. In actual implementation, the UE may access the NWDA function entity through a tunnel. For example, in the application scenario shown in FIG. 1, tunnels may be established in a UE-eNB-MME-NWDA sequence. In the application scenario shown in FIG. 2, tunnels may be established in a UE-(R)AN-AMF-NWDA manner.

2. The data may be information from (R)AN side (which may also be sent through a tunnel), for example, location information of a cell in which the UE is located.

3. The data may come from another network element in a network. For example, the data may be information reported by an application function (AF) entity or information reported by a network function (NF) entity. For example, in the application scenario shown in FIG. 1, the MME may send information to the interface $I_{NWDAMME}$, to notify the NWDA function entity of the information stored in the MME. The information may be UE connection management information (including an idle mode, a connected mode, or the like) stored in the MME. For another example, in the application scenario shown in FIG. 2, the AMF entity, the SMF entity, the PCF entity, and the like send data to the NWDA function entity by using corresponding interfaces.

It should be understood that a specific manner in which the NWDA function entity receives data is not defined in the standard, and the foregoing description is merely a possibility.

It should be noted that, because a 5G structure is not determined, the architecture in the embodiments of this application is merely used as an example to describe the solutions provided in this application. The entities that perform mobility management and session management may also be placed on another network element. Therefore, the architectures in the foregoing application scenarios are not intended to limit this application. For ease of understanding, in the description of the following embodiments, the AMF may be used to indicate a "function of performing mobility management", and the SMF indicates a "function of performing session management".

The UE in this application may be any other terminal apparatus.

Specific embodiments are used below to describe in detail the technical solutions of this application. The following several specific embodiments may be combined with each other, and a same or similar concept or process may not be described repeatedly in some embodiments.

Figure 3:
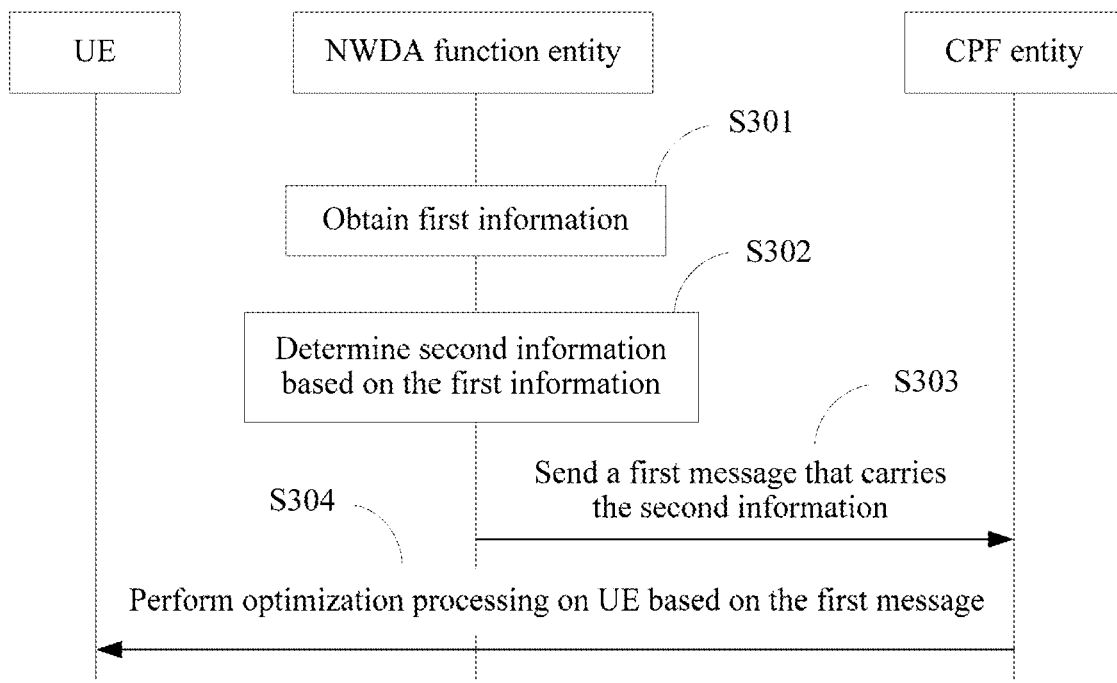
FIG. 3 is a schematic flowchart of a mobile network optimization processing method according to an embodiment of this application.

FIG. 3 is a schematic flowchart of a mobile network optimization processing method according to an embodiment of this application. As shown in FIG. 3, the mobile network optimization processing method provided in this embodiment includes the following steps.

S301. An NWDA function entity obtains first information.

In specific implementation, the first information may include one or more of: location information of UE, moving track information of the UE, historical location statistics of the UE, and service information of the UE. Alternatively, the first information may be information other than the several types of information, for example, information obtained through big data analysis. It should be noted that, in this embodiment, the service information may be service data sending end information.

For example, the first information includes one or more of: the location information of the UE, a moving track of the UE, the service information of the UE, and the like. The location information of the UE may include, for example, at least one of the following: global positioning system (GPS) information, cell identification information, and the like. The moving track of the UE may include, for example, at least one of the following: a moving speed of the UE, a moving direction of the UE, and the like. The service information of the UE may include, for example, at least one of the following: historical service information, application characteristic information of the UE, and the like. For example, the UE may accurately obtain the moving speed and the moving direction of the UE by using an acceleration sensor and a gyro sensor, may obtain, by using a GPS sensor in the UE, information about a current geographical location of the UE, may obtain acceleration information of the UE by using the acceleration sensor in the UE, and the like.

The NWDA function entity may receive the first information that is reported by at least one of the UE, an AF entity, an AN, and an NF entity to the NWDA function entity periodically or through event triggering. It should be understood that when the NWDA function entity simultaneously collects the first information from a plurality of network element devices, the NWDA function entity may determine, based on a current service processing requirement and information reported by a specific network element device, information for performing optimization processing on the UE, and ignore information reported by the other network element devices, or considers all pieces of information reported by the plurality of network element devices. This is not specifically limited in this embodiment of this application.

For example, the UE reports related information of the UE to the NWDA function entity periodically or through event triggering, and the information may include the location information of the UE, application information of the UE, and the like.

For example, the AF entity sends a notification message of related information of the UE to the NWDA function entity periodically or through event triggering, and the message includes identification information of the UE and application information of the UE.

For example, the NF entity collects related information of the UE periodically or through event triggering, and the information includes a location, a moving track, and the like of the UE. For example, in a scenario shown in FIG. 1, in a periodic tracking area update (TAU) procedure of a user, an MME may obtain E-UTRAN cell global identifier (ECGI) information of the user. This is a periodic triggering procedure. When the user moves out of a range of an original TA list, a TAU procedure caused by movement is triggered, and the MME may still obtain the ECGI information of the user based on the TAU procedure. This is an event triggering procedure. The NF entity reports the related information of the UE to the NWDA function entity periodically or through event triggering. For event triggering, two example manners are as follows: The NF entity may directly transfer the collected information to the NWDA function entity in a transparent transmission mode; alternatively, after receiving query information sent by the NWDA function entity, the NF entity returns the related information of the UE to the NWDA function entity.

For example, an (R)AN device (for example, an eNB) collects related information of the UE periodically or through event triggering. For example, in a scenario shown in FIG. 1, in a periodic TAU procedure of a user, a base station may obtain ECGI information of the user. This is a periodic triggering procedure. When the user moves out of a range of an original TA list, a TAU procedure caused by movement is triggered, and the base station may still obtain the ECGI information of the user based on the TAU procedure. This is an event triggering procedure. The (R)AN device reports the related information of the UE to the NWDA function entity periodically or through event triggering. For event triggering, the (R)AN device may directly transfer the collected information to the NWDA function entity in a transparent transmission mode; alternatively, after receiving query information sent by the NWDA function entity, the (R)AN device returns the information about the UE to the NWDA function entity.

S302. The NWDA function entity determines second information based on the first information.

In specific implementation, the second information may include an identifier of the UE. In addition, the second information may include time information for performing optimization processing on the UE, for example, a period of time after which the UE enters an idle mode/a connected mode (instead of immediately performing state transition), or a time of establishing a service that causes a state change of the UE, or a time of ending a service that causes a state change of the UE; or the second information may include information about a geographical location of the UE during state transition, for example, a specific location at which it is suitable for the UE to perform state transition; or the second information may include indication information for performing optimization processing on the UE, for example, information for instructing the UE to enter an idle mode/a connected mode, or an indication of establishing a service that causes a state change of the UE, or an indication of ending the service that causes a state change of the UE.

In other words, the second information may include one or more of: the location information of the UE, the time information for performing optimization processing on the UE, and the indication information for performing optimization processing on the UE. The location information of the UE may be location information of the UE at a preset time point or in a preset time period. It may be understood that the preset time point may be a current moment or may be a subsequent moment, and the preset time period may be a time period including a current moment or may be a subsequent time period. It should be noted that the preset time point/time period may be, for example, set by the NWDA based on a service start or end time point/time period obtained by the NWDA by analyzing the first information.

For example, for the UE in the connected mode, the NWDA function entity determines, based on the collected first information, a time at which the UE releases a resource. For example, a specific method for determining whether the UE needs to change to the idle mode may be: determining, based on the moving track of the UE, a time and/or a location at which the UE needs to change to the idle mode. The determined second information may include a period of time after which the UE releases the resource and changes to the idle mode, for example, a period of time after which the UE becomes idle (instead of immediately becoming idle).

For example, for the UE in the idle mode, the NWDA function entity determines, based on the collected first information, a time and a location at which a resource is allocated to the UE. For example, the NWDA function entity determines information about a time and/or a location at which the UE is transitioned to the connected mode, or information about a time and/or a location at which a session is established for the UE, or a time at which a bearer or a QoS flow is established for the UE.

For example, when the first information includes the location information and the moving track information of the UE, that the NWDA function entity determines the second information based on the first information includes: determining, by the NWDA function entity, the location information of the UE at the preset time point or in the preset time period based on the location information and the moving track information that are of the UE.

For example, when the first information includes the service information of the UE, that the NWDA function entity determines the second information based on the first information includes: determining, by the NWDA function entity based on the service information of the UE, the time information for performing optimization processing on the UE.

S303. The NWDA function entity sends, to a CPF entity, a first message that carries the second information.

Specifically, the first message is used to notify the CPF entity that the CPF entity may perform optimization processing on the UE based on the second information. The first message may be, for example, a resource release request message or a resource allocation request message.

For example, for the UE in the connected mode, the NWDA function entity sends a resource release request message of the UE to a control plane function entity (the MME, an AMF entity, an SMF entity, or the like). The resource release request message may include identification (ID) information of a to-be-released resource (identifying a resource that needs to be released), the location information of the UE, and the identification information of the UE. The identification information identifying the resource that needs to be released is a state transition identifier of the UE, the location information of the UE is an ECGI, and the identification information of the UE is temporary identification information or permanent identification information of the UE. When a granularity of the resource that needs to be released is a session, an ID of the to-be-released resource is a packet data unit (PDU) session ID, the identification information identifying the resource that needs to be released is identification information used to instruct to release (or deactivate) the PDU session, the location information of the UE is the ECGI, and the identification information of the UE is temporary identification information or permanent identification information of the UE.

For example, for the UE in the idle mode, the NWDA function entity sends a resource allocation request message of the UE to a control plane function entity. The resource allocation request message includes the identification information of the UE and specific information for establishing a resource for the UE. Specifically, when the UE needs to be restored to the connected mode, the specific information for establishing the resource for the UE is identification information for transitioning the UE from the idle mode to the connected mode, and the control plane function entity is an MME or an AMF; or when a new session needs to be established for the UE, the specific information for establishing the resource for the UE is identification information for establishing a new session for the UE and other information required for establishing the session (for example, information such as an access point name (APN) or a data network name (DNN)), and the control plane function entity is an MME or an SMF; or when a new bearer or QoS flow needs to be established for the UE, the specific information for establishing the resource for the UE is identification information for establishing the new bearer or QoS flow (for example, QoS information of the bearer) for the UE, and the control plane function entity is an MME or an SMF.

S304. The CPF entity performs optimization processing on UE based on the first message.

For example, for the UE in the connected mode, the CPF entity performs a release procedure of a related resource based on the second information carried in the first message. A release granularity may be: changing a state of the UE (from the connected mode to the idle mode); or releasing a PDU session of the UE, which is a coarse granularity; or releasing a QoS flow of the UE, which is a fine granularity.

For example, for the UE in the idle mode, the CPF entity performs a connection establishment operation based on the second information carried in the first request message. For example, the MME/AMF entity pages the UE when receiving the identification information for transitioning the UE from the idle mode to the connected mode, or the MME/SMF entity performs a session establishment process when receiving the identification information for establishing a new session for the UE. Particularly, the second information carried in the first request message may include specific location information of the UE, and is used to optimize a paging range of the UE.

According to the mobile network optimization processing method provided in this embodiment, a network element responsible for a network data analytics (NWDA) function analyzes application layer information (namely, the first information) of the UE to obtain the information for performing optimization processing on the UE, and notifies the CPF entity such as a network element responsible for mobility management or a network element responsible for session management, so that the CPF entity performs optimization processing on the UE based on the information for performing optimization processing on the UE.

According to the mobile network optimization processing method provided in this embodiment, joint optimization is performed at an application layer and a communications layer, and information provided by the application layer is used to instruct the UE to perform proper state transition, so as to resolve all or at least some of prior-art problems in a process of controlling state transition of the UE. This is specifically reflected in at least one of the following aspects:

(1) Before the UE needs to transmit data, the UE in the idle mode is transitioned to the connected mode in advance based on the application layer information of the UE, without waiting for a service request process triggered by a network side, thereby reducing a latency;

(2) Based on the application layer information of the UE, the UE is directly and quickly transitioned to the idle mode, without waiting for a waiting time of 10 seconds to 30 seconds specified in a network, thereby reducing power consumption of the UE, avoiding ineffective occupation of an air interface resource, and improving radio resource utilization;

(3) When the UE in the idle mode is transitioned to the connected mode, information about a location of the UE when the UE is paged may be predicted based on the application layer information of the UE, to reduce a paging range of the UE, thereby reducing signaling overheads during paging.

To make the technical solutions and beneficial effects of this application clearer and more comprehensible, the following further describes the technical solutions of this application in detail by using some specific embodiments and with reference to the accompanying drawings. Apparently, these embodiments are intended to illustrate but not limit this application.

Figure 4:
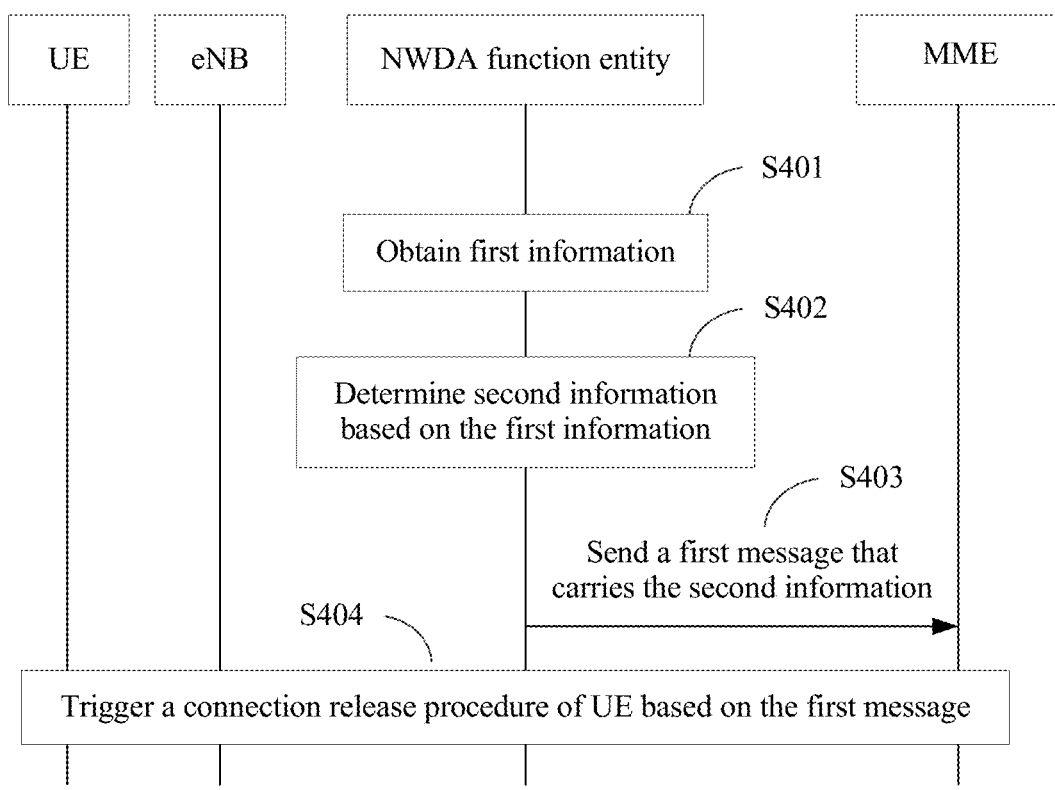
FIG. 4 is a schematic flowchart of a mobile network optimization processing method according to an embodiment of this application.

FIG. 4 is a schematic flowchart of a mobile network optimization processing method according to an embodiment of this application. In this embodiment, an application scenario shown in FIG. 1 is used as an example to describe a process of transitioning UE to an idle mode. For a same or similar step and a used term, refer to descriptions of the foregoing embodiment in FIG. 3. Details are not described again in this embodiment.

As shown in FIG. 4, the process of transitioning the UE to the idle mode provided in this embodiment includes the following steps.

S401. An NWDA function entity obtains first information.

Optionally, the NWDA function entity may receive the first information that is reported by at least one of the UE, an AN, an AF entity, and an NF entity to the NWDA function entity periodically or through event triggering. In specific implementation, the first information may include one or more of: current location information of the UE, moving track information of the UE, historical location statistics of the UE, and service information of the UE. Alternatively, the first information may be information other than the several types of information, for example, information obtained through big data analysis. It should be noted that, in this embodiment, the service information may be service data sending end information.

S402. The NWDA function entity determines second information based on the first information.

S403. The NWDA function entity sends, to an MME, a first message that carries the second information.

For example, the NWDA function entity predicts, based on the obtained first information, a time at which the UE is to be in the idle mode, and sends, to the MME based on a prediction result, a first message that carries the prediction result. For example, the NWDA may predict the time based on historical service information, a prompt of an application message, or the like. The prediction result may include a time at which the UE is transitioned to the idle mode; for example, the prediction result may be a period of time after which the UE changes to the idle mode, or may be that the UE needs to immediately change to the idle mode. Alternatively, the prediction result may include information about a geographical location at which the UE changes to the idle mode, for example, a specific location at which it is suitable for the UE to change to the idle mode. Alternatively, the prediction result may include the foregoing two types of information.

For example, the NWDA function entity predicts that it is suitable for the UE to immediately change to the idle mode, and therefore, the second information may include indication information indicating that the UE is to enter the idle mode or service end indication information.

For example, the NWDA function entity predicts that it is suitable for the UE to change to the idle mode after a period of time, and therefore, the second information may include time information for performing optimization processing on the UE, and may further include indication information indicating that the UE is to enter the idle mode or service end indication information.

S404. The MME triggers a connection release procedure of the UE based on the first message.

It should be noted that how the time information for performing optimization processing on the UE is reflected in processing performed by a network element is determined by implementation of the network element. For example, the NWDA function entity analyzes the first information to predict the time at which the UE is to be in the idle mode. A timer may be set on the NWDA function entity, and then the NWDA function entity sends a resource release request message of the UE to the MME when the timer expires. It may be understood that if the second information includes the time information for transitioning the UE to the idle mode or ending the service, a timer may be set on the MME, and the MME triggers a connection release process of the UE when the timer expires.

It should be noted that the process of transitioning the UE to the idle mode provided in this embodiment may be performed when the UE is in a connected mode.

Figure 5:
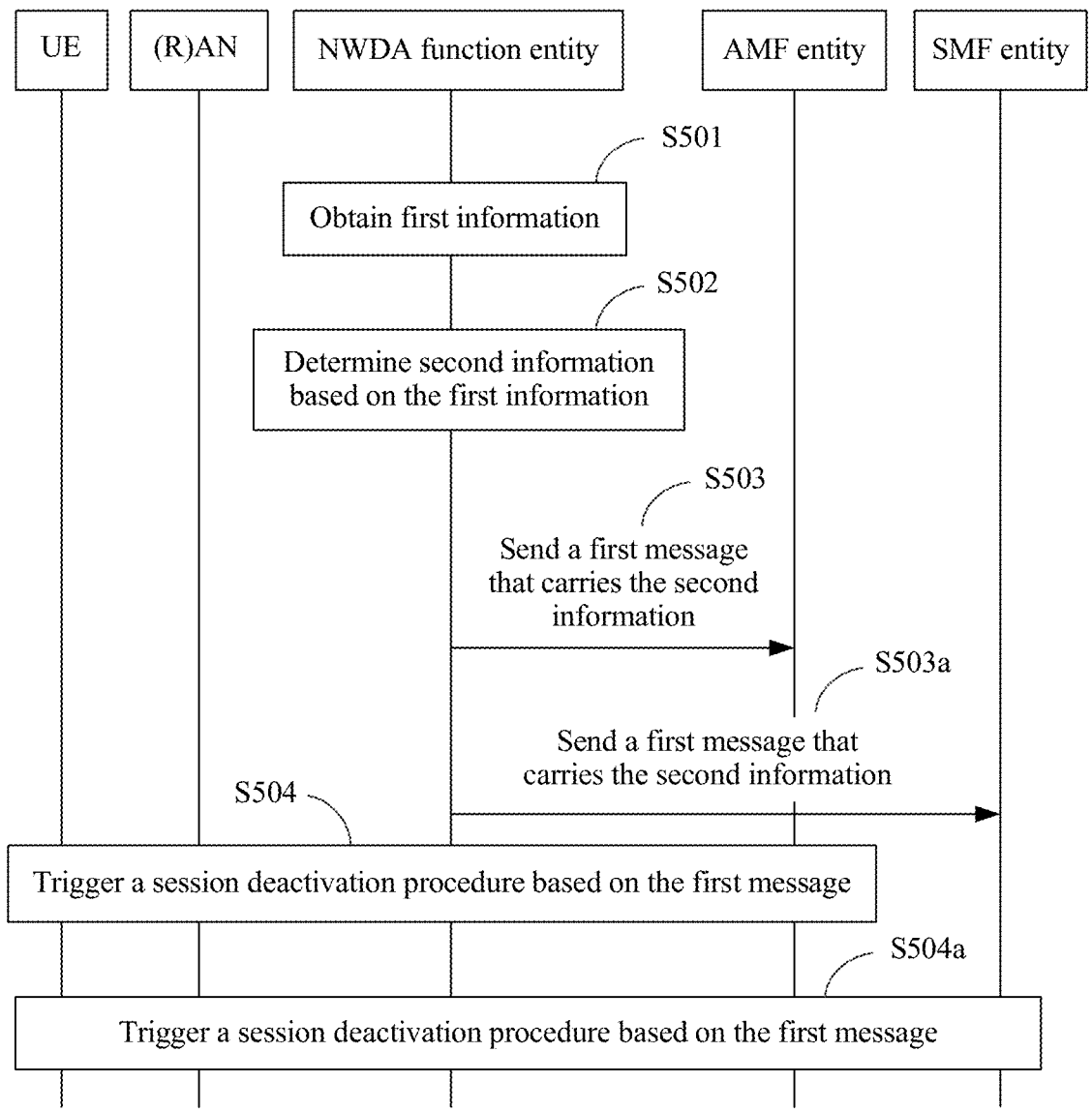
FIG. 5 is a schematic flowchart of a mobile network optimization processing method according to an embodiment of this application.

FIG. 5 is a schematic flowchart of a mobile network optimization processing method according to an embodiment of this application. In this embodiment, an application scenario shown in FIG. 2 is used as an example to describe a process of transitioning UE to an idle mode. For a same or similar step and a used term, refer to descriptions of the foregoing embodiment in FIG. 3. Details are not described again in this embodiment.

As shown in FIG. 5, the process of transitioning the UE to the idle mode provided in this embodiment includes the following steps:

S501. An NWDA function entity obtains first information.

S502. The NWDA function entity determines second information based on the first information.

S503. The NWDA function entity sends, to an AMF entity, a first message that carries the second information.

S504. The AMF entity triggers a session deactivation procedure based on the first message.

It should be noted that, in a specific implementation process, S503 and S504 may be replaced with the following operations:

S503a: The NWDA function entity sends, to an SMF entity, a first message that carries the second information.

S504a: The SMF entity triggers a session deactivation procedure based on the first message.

It should be noted that the session deactivation procedure is a process in which the SMF entity instructs an (R)AN to delete a session context and the SMF entity instructs a UPF entity to delete session connection identification information.

Which one of the foregoing two operations is selected depends on a connection release manner, and either of the two operations can be selected in implementation.

It may also be understood that the process of transitioning the UE to the idle mode provided in this embodiment may be performed when the UE is in a connected mode.

It should be noted that, as described above, because a 5G structure is not determined, in this embodiment, the AMF entity and the SMF entity are only used as examples for description. Mobility management may be performed by another NE. Therefore, a protection scope is not limited to operations specific to the AMF entity and the SMF entity.

In the process of transitioning the UE to the idle mode provided in the foregoing embodiment, joint optimization is performed at an application layer and a communications layer, information provided by the application layer is used to instruct the UE to perform proper state transition, and the UE is directly and quickly transitioned to the idle mode based on the application layer information of the UE, or a state of the UE changes from the connected mode to the idle mode in advance without waiting for a waiting time of 10 seconds to 30 seconds specified in a network, thereby reducing power consumption of the UE, avoiding invalid occupation of an air interface resource, and improving a radio resource utilization.

Figure 6:
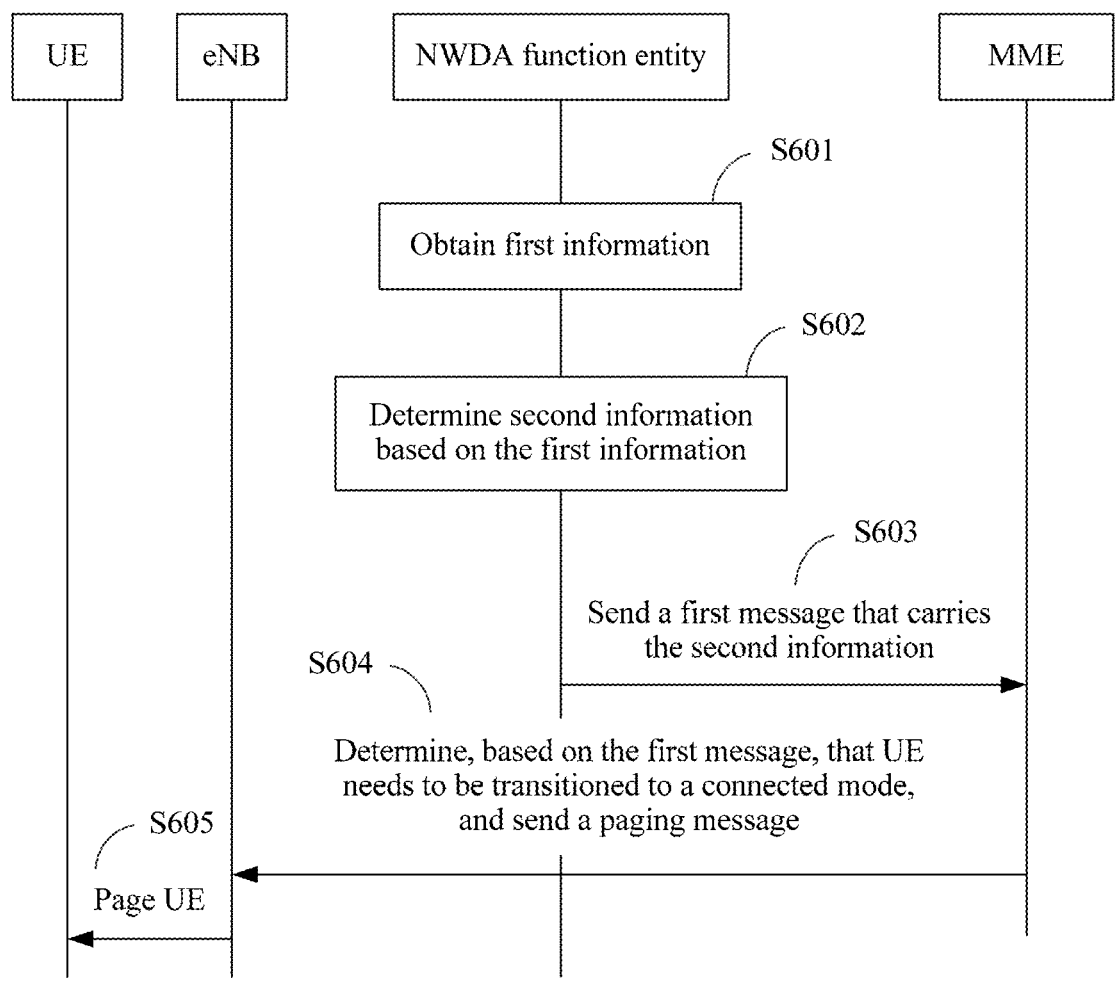
FIG. 6 is a schematic flowchart of a mobile network optimization processing method according to an embodiment of this application.

FIG. 6 is a schematic flowchart of a mobile network optimization processing method according to an embodiment of this application. In this embodiment, an application scenario shown in FIG. 1 is used as an example to describe a process of transitioning UE to a connected mode. For a same or similar step and a used term, refer to descriptions of the foregoing embodiment in FIG. 3. Details are not described again in this embodiment.

As shown in FIG. 6, the process of transitioning the UE to the connected mode provided in this embodiment includes the following steps.

S601. An NWDA function entity obtains first information.

S602. The NWDA function entity determines second information based on the first information.

S603. The NWDA function entity sends, to an MME, a first message that carries the second information.

For example, the NWDA function entity predicts, based on the obtained first information, a time at which the UE is to be in the connected mode, and sends, to the MME based on a prediction result, a first message that carries the prediction result. The prediction result may include a time at which the UE needs to be transitioned to the connected mode; for example, the prediction result may be a period of time after which the UE changes to the connected mode, or may be that the UE needs to immediately change to the connected mode. Alternatively, the prediction result may include information about a geographical location at which the UE needs to change to the connected mode, for example, a specific location at which the UE needs to change to the connected mode. Alternatively, the prediction result may include the foregoing two types of information.

For example, the NWDA function entity predicts that it is suitable to transition the UE to the connected mode immediately, and therefore, the second information may include current location information of the UE. Optionally, the second information may further include indication information indicating that the UE is to enter the connected mode or service start indication information. The indication information indicating that the UE is to enter the connected mode or the service start indication information is optional, because the MME may determine, based on a message name, that the first message is used to request to transition the UE to the connected mode (implicitly indicating that the state needs to be transitioned), or may determine, based on a connected mode indication, that the first message is used to request to transition the UE to the connected mode (explicitly indicating that the state needs to be transitioned).

For example, the NWDA function entity predicts that it is suitable for the UE to change to the connected mode after a period of time, and therefore, the second information may include indication information indicating that the UE is to enter the connected mode or service start indication information indicating that the UE needs to enter the connected mode. Optionally, the second information further includes location information and/or time information of service occurrence.

For example, the NWDA function entity predicts location information based on which the UE needs to be transitioned to the connected mode. It should be noted that the location information may be a data structure. In other words, the location information may be spatial information, namely, may include a specific geographical location; or may be spatial-temporal information, namely, may include a specific geographical location and time associated with the geographical location.

S604. The MME determines, based on the first message, that UE needs to be transitioned to a connected mode, and sends a paging message to an eNB, to request to establish a connection of the UE.

S605. The eNB pages the UE.

It may be understood that the process ends if the UE is already in the connected mode.

It may also be understood that how time information for performing optimization processing on the UE is reflected in processing performed by a network element is determined by implementation of the network element. For example, the NWDA function entity analyzes the first information to predict the time at which the UE is to be in the connected mode. A timer may be set on the NWDA function entity, and then the NWDA function entity sends a resource allocation request message of the UE to the MME when the timer expires. If the second information includes the time at which the UE is to be in the connected mode, a timer may be set on the MME, and the MME sends a paging message to the eNB when the timer expires. After receiving the paging message, the UE completes the process of transitioning the UE to the connected mode.

For example, there may be two operations in a specific implementation process of S604:

(1) The second information includes the time information for performing optimization processing on the UE, but does not include location information for performing optimization processing on the UE. In this case, only a normal paging process can be performed: the MME pages all eNBs in a TA list, and then the eNBs page the UE. In this way, the UE in an idle mode can be transitioned to the connected mode in advance based on application layer information of the UE, without waiting for a service request process triggered by a network side, thereby reducing a latency.

(2) The second information includes location information for performing optimization processing on the UE. In this case, the MME may send, based on the location information, a paging message to an eNB corresponding to the location information. In this way, information about a location of the UE when the UE is paged may be predicted based on application layer information of the UE, to reduce a paging range of the UE, thereby reducing signaling overheads during paging.

It should be noted that when the MME receives the first message sent by the NWDA function entity, if the second information includes only the location information of the UE (the location information may be spatial information, namely, may include a specific geographic location, or may be spatial-temporal information, namely, may include a specific geographic location and a time associated with the geographic location), the MME may immediately send a paging message to an E-UTRAN corresponding to the location information, or may store the second information, and page the UE based on the location information of the UE when the UE needs to be paged because of a service request triggered by the network side.

It may be understood that the process of transitioning the UE to the connected mode provided in this embodiment may be performed when the UE is in the idle mode. Alternatively, the AF entity may trigger, based on a service requirement, the process of transitioning the UE to the connected mode. In this case, a state of the UE is not important. In other words, an indication (for example, a service trigger indication) of transitioning the UE to the connected mode may still be sent to the UE even if there is no state information of the UE in a network.

Optionally, before S601, the following steps may be further included.

Step 1: When detecting that the UE is in the idle mode, the MME sends a first notification message to the NWDA function entity.

For example, the MME may detect, by using a control plane message in an S1 connection release process, that the UE is in the idle mode, and send the first notification message to the NWDA function entity, to notify the NWDA function entity that the UE is in the idle mode. The first notification message includes an identifier of the UE, and may further include an identifier indicating that the UE in the idle mode.

Step 2: After receiving the first notification message sent by the MME, the NWDA function entity obtains the first information, and then starts to predict location information, time information, and the like for restoring the UE to the connected mode next time.

It may be understood that there may be no time sequence relationship between steps 1-2 and S601. S601 may be performed before steps 1-2, or steps 1-2 may be performed before S601. Alternatively, there may be an intersection when steps 1-2 and S601 are performed (the steps may be partially overlapped).

Figure 7:
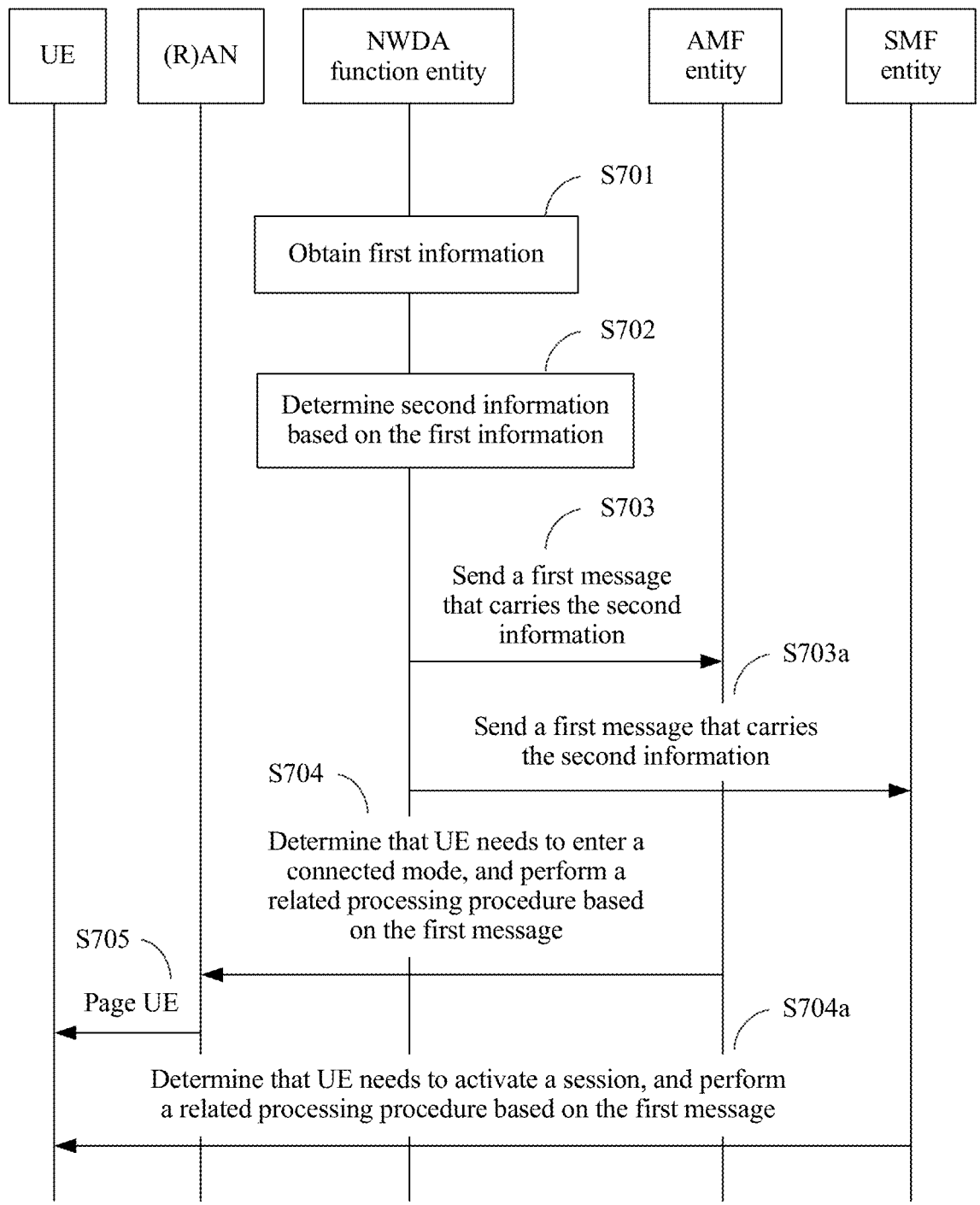
FIG. 7 is a schematic flowchart of a mobile network optimization processing method according to an embodiment of this application.

FIG. 7 is a schematic flowchart of a mobile network optimization processing method according to an embodiment of this application. In this embodiment, an application scenario shown in FIG. 2 is used as an example to describe a process of transitioning UE to a connected mode. For a same or similar step and a used term, refer to descriptions of the foregoing embodiment in FIG. 3. Details are not described again in this embodiment.

As shown in FIG. 7, the process of transitioning the UE to the connected mode provided in this embodiment includes the following steps.

S701. An NWDA function entity obtains first information.

S702. The NWDA function entity determines second information based on the first information.

S703. The NWDA function entity sends, to an AMF entity, a first message that carries the second information.

S704. The AMF entity determines that the UE needs to enter a connected mode, and performs a related processing procedure based on the first message.

For example, the AMF entity may send a paging message to an (R)AN based on the second information, to request to establish a connection of the UE, or the AMF entity triggers a related session activation procedure based on the second information. If the UE is currently in a non-access stratum (NAS) idle mode, step 705 is performed.

S705. An (R)AN pages the UE.

It should be noted that, in a specific implementation process, if the UE is currently in a NAS connected mode, but a session of the UE is not activated, S703 to S705 may be replaced with the following operations:

S703a: The NWDA function entity sends, to an SMF entity, a first message that carries the second information.

S704a. The SMF entity determines that the UE needs to activate a session, and performs a related processing procedure based on the first message.

For example, the SMF entity may trigger a session activation procedure in an existing manner based on the second information.

It should be noted that there may be two operations in a specific implementation process of S704:

(1) The second information includes time information for performing optimization processing on the UE, but does not include location information for performing optimization processing on the UE. In this case, only a normal paging process can be performed: the AMF entity pages all (R)ANs in a TA list, and then the (R)ANs page the UE. In this way, the UE in an idle mode can be transitioned to the connected mode in advance based on application layer information of the UE, without waiting for a service request process triggered by a network side, thereby reducing a latency.

(2) The second information includes location information for performing optimization processing on the UE. In this case, the AMF entity may send, based on the location information in the second information, a paging message to an (R)AN corresponding to the location information. In this way, information about a location of the UE when the UE is paged may be predicted based on application layer information of the UE, to reduce a paging range of the UE, thereby reducing signaling overheads during paging.

When the AMF entity receives the first message that is sent by the NWDA function entity and that carries the second information, if the second information includes only the location information of the UE (the location information may be spatial information, namely, may include a specific geographic location, or may be spatial-temporal information, namely, may include a specific geographic location and a time associated with the geographic location), the AMF entity may immediately send the paging message to the (R)AN corresponding to the location information, or may store the second information, and page the UE based on the location information of the UE when the UE needs to be paged because of a service request triggered by the network side.

It may also be understood that the process of transitioning the UE to the connected mode provided in this embodiment may be performed when the UE is in the idle mode. Alternatively, the AF entity may periodically trigger the process of transitioning the UE to the connected mode. In this case, a state of the UE is not important. In other words, an indication (for example, a service trigger indication) indicating that the UE needs to be in the connected mode may still be sent to the UE even if there is no state information of the UE in a network.

Optionally, before S701, the following steps may be further included.

Step 1: When detecting that the UE is in the idle mode, the AMF entity sends a first notification message to the NWDA function entity.

For example, the AMF entity may detect, by using a control plane message in a connection release procedure of the UE, that the UE is in the idle mode, and send the first notification message to the NWDA function entity, to notify the NWDA function entity that the UE is in the idle mode. The first notification message includes an identifier of the UE, and may further include an identifier indicating that the UE in the idle mode.

Step 2: After receiving the first notification message sent by the AMF entity, the NWDA function entity obtains the first information, and then starts to predict location information, time information, and the like for restoring the UE to the connected mode next time.

It may also be understood that there may be no time sequence relationship between steps 1-2 and S701. S701 may be performed before steps 1-2, or steps 1-2 may be performed before S701. Alternatively, there may be an intersection when steps 1-2 and S701 are performed (some steps may be simultaneously performed).

In the process of transitioning the UE to the connected mode provided in the foregoing embodiment, joint optimization is performed at an application layer and a communications layer, and information provided by the application layer is used to instruct the UE to perform proper state transition. The UE in the idle mode may be transitioned to the connected mode in advance based on the application layer information of the UE, without waiting for a service request process triggered by the network side, thereby reducing a latency. In addition, when the UE in the idle mode is transitioned to the connected mode, the information about the location of the UE when the UE is paged may be predicted based on the application layer information of the UE, to reduce a paging range of the UE, thereby reducing signaling overheads during paging.

Based on the idea that is the same as that of the foregoing method embodiments, the embodiments of this application further provide a plurality of function entities. The plurality of function entities may be implemented by software, hardware, or a combination of software and hardware, and may be configured to implement the optimization processing method provided in the foregoing method embodiments. The apparatus part corresponds to the foregoing methods, and corresponding content and a technical effect of the apparatus part are the same as those of the foregoing methods. Details are not described herein again.

Figure 8:
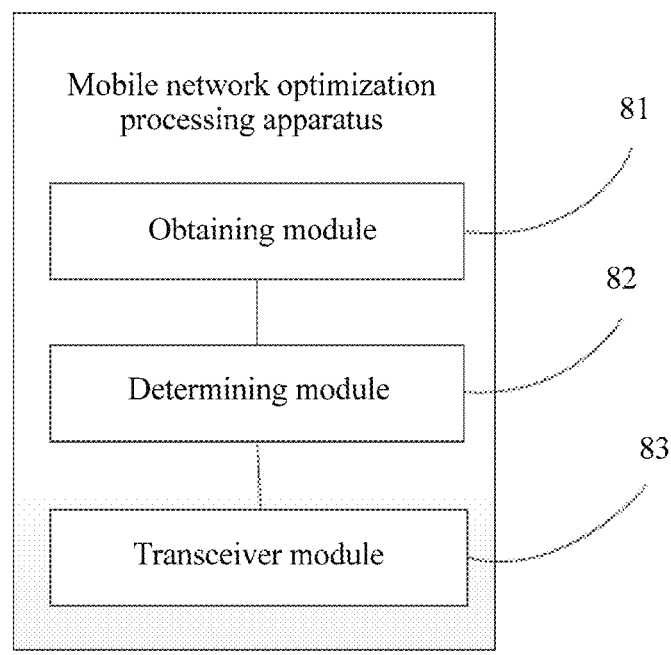
FIG. 8 is a schematic structural diagram of a mobile network optimization processing apparatus according to an embodiment of this application.

FIG. 8 is a schematic structural diagram of a mobile network optimization processing apparatus according to an embodiment of this application. As shown in FIG. 8, the apparatus may be implemented as a part of an NWDA function entity or an entire NWDA function entity by software, hardware, or a combination of software and hardware. The apparatus may include an obtaining module 81, a determining module 82, and a transceiver module 83.

For example, the obtaining module 81 is configured to obtain first information, where the first information includes at least one of the following: location information of UE, moving track information of the UE, historical location statistics of the UE, and service information of the UE; the determining module 82 is configured to determine second information based on the first information, where the second information includes at least one of the following: location information of the UE at a preset time point or in a preset time period, time information for performing optimization processing on the UE, and indication information for performing optimization processing on the UE; and the transceiver module 83 is configured to send, to a control plane function entity, a first message that carries the second information, so that the control plane function entity performs optimization processing on the UE based on the second information.

In actual application, the obtaining module 81 may be specifically configured to perform at least one of the following operations: obtaining the first information reported by the UE; obtaining the first information reported by an access network AN; obtaining the first information reported by an application function AF entity; and obtaining the first information reported by a network function NF entity.

Optionally, the information for performing optimization processing on the UE includes identification information of the UE and at least one of the following information: the location information of the UE at the preset time point or in the preset time period, the time information for performing optimization processing on the UE, and the indication information for performing optimization processing on the UE.

Optionally, the time information for performing optimization processing on the UE includes: a time at which the UE enters an idle mode; or a time at which the UE enters a connected mode; or a time of establishing a service that causes a state change of the UE; or a time of ending a service that causes a state change of the UE.

Optionally, the indication information for performing optimization processing on the UE includes: an indication that the UE enters an idle mode; or an indication that the UE enters a connected mode; or an indication of establishing a service that causes a state change of the UE; or an indication of ending a service that causes a state change of the UE.

Optionally, the first information includes at least one of the following information: the location information of UE, the moving track information of the UE, and the service information of the UE.

Optionally, the first information includes the location information and the moving track information that are of the UE, and the determining module 82 is specifically configured to determine the location information of the UE at the preset time point or in the preset time period based on the location information and the moving track information that are of the UE.

Optionally, optimization assistance information of the UE includes the service information of the UE, and the determining module 82 is specifically configured to determine, based on the service information of the UE, the time information for performing optimization processing on the UE.

In a possible design, the transceiver module 83 is further configured to receive current state information of the UE that is sent by the CPF entity, where the state information includes the connected mode or the idle mode.

The mobile network optimization processing apparatus provided in this embodiment can perform a function performed by the NWDA function entity in the foregoing method embodiments. An implementation principle and a technical effect of the mobile network optimization processing apparatus are similar to those of the method embodiments. Details are not described herein again.

Figure 9:
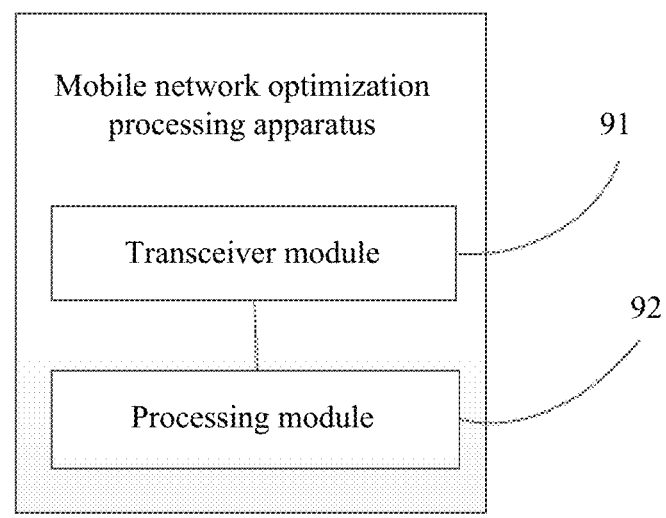
FIG. 9 is a schematic structural diagram of a mobile network optimization processing apparatus according to an embodiment of this application.

FIG. 9 is a schematic structural diagram of a mobile network optimization processing apparatus according to an embodiment of this application. As shown in FIG. 9, the apparatus may be implemented as a part of a CPF entity (for example, an MME, an AMF, or an SMF) or an entire CPF entity by software, hardware, or a combination of software and hardware. The apparatus may include a transceiver module 91 and a processing module 92.

For example, the transceiver module 91 is configured to receive a first message sent by an NWDA function entity, where the first message carries second information, and the second information is determined by the NWDA function entity based on first information; and the processing module 92 is configured to perform optimization processing on the UE based on the first message.

Optionally, the second information includes identification information of the UE and at least one of the following information: location information of the UE at a preset time point or in a preset time period, time information for performing optimization processing on the UE, and indication information for performing optimization processing on the UE.

Optionally, the time information for performing optimization processing on the UE includes: a time at which the UE enters an idle mode; or a time at which the UE enters a connected mode; or a time of establishing a service that causes a state change of the UE; or a time of ending a service that causes a state change of the UE.

Optionally, the indication information for performing optimization processing on the UE includes: an indication that the UE enters an idle mode; or an indication that the UE enters a connected mode; or an indication of establishing a service that causes a state change of the UE; or an indication of ending a service that causes a state change of the UE.

Optionally, the first information includes at least one of the following information: location information of UE, moving track information of the UE, historical location statistics of the UE, and service information of the UE.

In actual application, the processing module 92 is specifically configured to: determine that the UE needs to be transitioned to the idle mode, and send a connection release request to an access network based on the second information, to request to release a connection of the UE; or determine that the UE needs to be transitioned to the connected mode, and send a paging message to an access network based on the second information, to request to establish a connection of the UE; or determine that the UE needs to activate a session, and trigger a session activation procedure based on the second information.

In a possible implementation, the second information includes current location information of the UE, and the processing module 92 is specifically configured to: determine a paging range of the UE based on the current location information of the UE; and send a paging message to an access network within the determined paging range, to request to establish a connection of the UE.

In a possible implementation, the second information includes the location information of the UE at the preset time point or in the preset time period, and the processing module 92 is specifically configured to: determine, at the preset time point or in the preset time period, a paging range of the UE based on the location information of the UE at the preset time point or in the preset time period; and send a paging message to an access network within the determined paging range, to request to establish a connection of the UE.

In actual application, a CPF entity may further send current state information of the UE to the NWDA function entity, where the current state information of the UE includes that the UE is in the connected mode or the idle mode. Based on this, the transceiver module 91 is further configured to send the current state information of the UE to the NWDA function entity.

The mobile network optimization processing apparatus provided in this embodiment can perform a function performed by the CPF entity in the foregoing method embodiments. An implementation principle and a technical effect of the mobile network optimization processing apparatus are similar to those of the method embodiments. Details are not described herein again.

Figure 10:
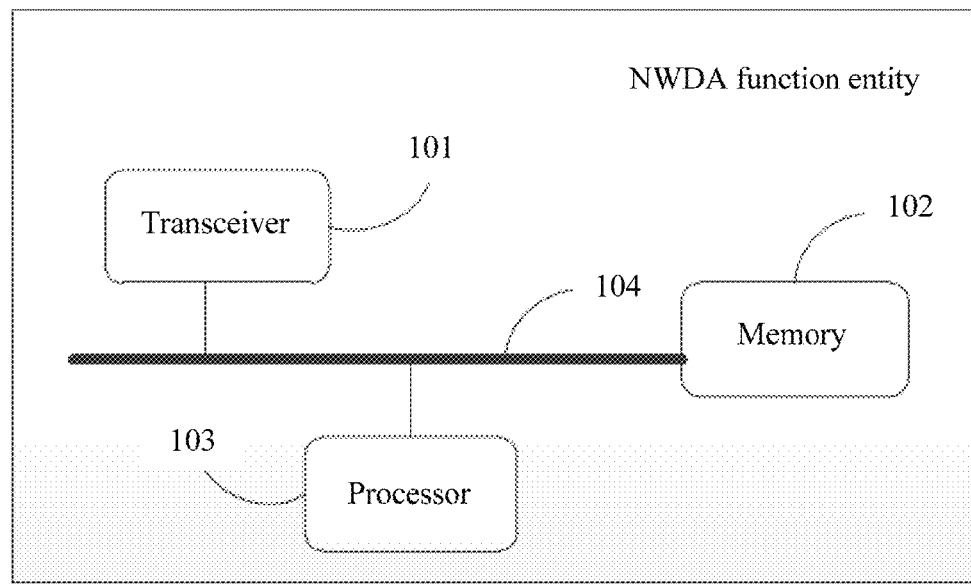
FIG. 10 is a schematic structural diagram of an NWDA function entity according to an embodiment of this application.

FIG. 10 is a schematic structural diagram of an NWDA function entity according to an embodiment of this application. As shown in FIG. 10, the NWDA function entity includes a transceiver 101, a memory 102, a processor 103, and at least one communications bus 104.

The memory 102 stores a software program. The memory 102 may include a high-speed RAM, and may further include a nonvolatile memory NVM, for example, at least one magnetic memory. The memory 102 may store various programs, which are used to implement various processing functions and implement method steps in this embodiment. The processor 103 is coupled to the memory 102. The communications bus 104 is configured to implement communication connection between elements. Optionally, the transceiver 101 in this embodiment may be a radio frequency module or a baseband module on a network device.

In this embodiment, the transceiver 101 is configured to obtain first information. The processor 103 runs the software program in the memory 102 to: determine second information based on the first information, and send, to a CPF entity by using the transceiver 101, a first message that carries the second information, so that the CPF entity performs optimization processing on the UE based on the second information.

In actual application, the transceiver 101 may be specifically configured to perform at least one of the following operations: obtaining the first information reported by the UE; obtaining the first information reported by an access network AN; obtaining the first information reported by an application function AF entity; and obtaining the first information reported by a network function NF entity.

Optionally, the second information includes identification information of the UE and at least one of the following information: location information of the UE at a preset time point or in a preset time period, time information for performing optimization processing on the UE, and indication information for performing optimization processing on the UE.

Optionally, the time information for performing optimization processing on the UE includes: a time at which the UE enters an idle mode; or a time at which the UE enters a connected mode; or a time of establishing a service that causes a state change of the UE; or a time of ending a service that causes a state change of the UE.

Optionally, the indication information for performing optimization processing on the UE includes: an indication that the UE enters an idle mode; or an indication that the UE enters a connected mode; or an indication of establishing a service that causes a state change of the UE; or an indication of ending a service that causes a state change of the UE.

Optionally, the first information includes at least one of the following information: location information of UE, moving track information of the UE, historical location statistics of the UE, and service information of the UE.

Optionally, the first information includes current location information and the moving track information that are of the UE, and the processor 103 is specifically configured to determine the location information of the UE at the preset time point or in the preset time period based on the current location information and the moving track information that are of the UE.

Optionally, the first information of the UE includes the service information of the UE, and the processor 103 is specifically configured to determine, based on the service information of the UE, the time information for performing optimization processing on the UE.

In a possible design, the transceiver 101 is further configured to receive current state information of the UE that is sent by the CPF entity, where the state information includes the connected mode or the idle mode.

The NWDA function entity provided in this embodiment can perform a function performed by the NWDA function entity in the foregoing method embodiments. An implementation principle and a technical effect of the NWDA function entity are similar to those of the method embodiments. Details are not described herein again.

Figure 11:
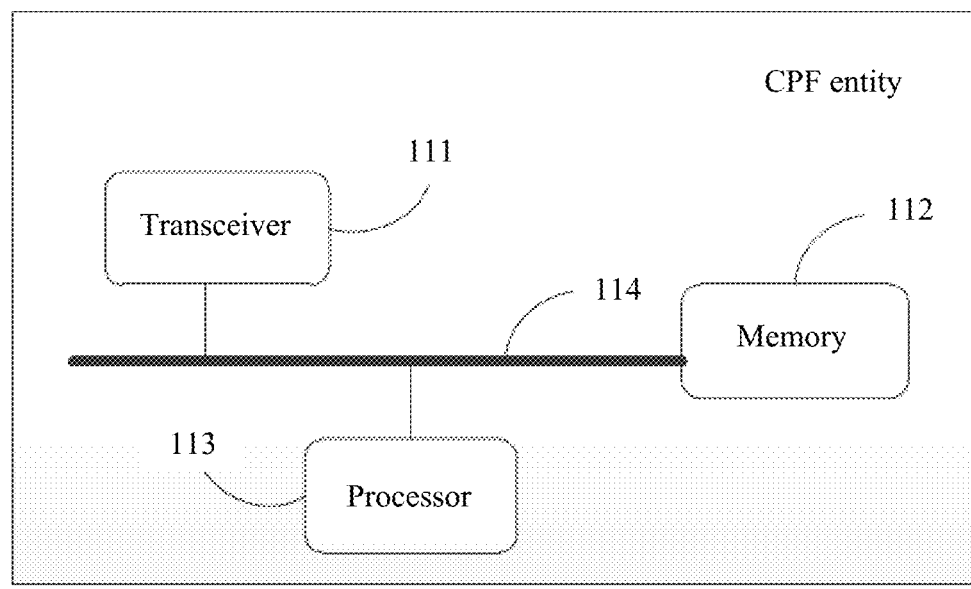
FIG. 11 is a schematic structural diagram of a control plane function entity according to an embodiment of this application.

FIG. 11 is a schematic structural diagram of a CPF entity according to an embodiment of this application. As shown in FIG. 11, the CPF entity includes a transceiver 111, a memory 112, a processor 113, and at least one communications bus 114.

The memory 112 stores a software program. The memory 112 may include a high-speed RAM memory, and may further include a nonvolatile memory NVM, for example, at least one magnetic memory. The memory 112 may store various programs, which are used to implement various processing functions and implement method steps in this embodiment. The processor 113 is coupled to the memory 112. The communications bus 114 is configured to implement communication connection between elements. Optionally, the transceiver 111 in this embodiment may be a radio frequency module or a baseband module on a network device.

In this embodiment, the transceiver 111 is configured to receive a first message that is sent by an NWDA function entity and that carries second information, where the second information is obtained by the NWDA function entity based on the first information. The processor 113 runs a software program in the memory 112 to perform optimization processing on the UE based on the second information.

Optionally, the second information includes identification information of the UE and at least one of the following information: location information of the UE at a preset time point or in a preset time period, time information for performing optimization processing on the UE, and indication information for performing optimization processing on the UE.

Optionally, the time information for performing optimization processing on the UE includes: a time at which the UE enters an idle mode; or a time at which the UE enters a connected mode; or a time of establishing a service that causes a state change of the UE; or a time of ending a service that causes a state change of the UE.

Optionally, the indication information for performing optimization processing on the UE includes: an indication that the UE enters an idle mode; or an indication that the UE enters a connected mode; or an indication of establishing a service that causes a state change of the UE; or an indication of ending a service that causes a state change of the UE.

Optionally, the first information includes at least one of the following information: location information of UE, moving track information of the UE, historical location statistics of the UE, and service information of the UE.

In actual application, the processor 113 is specifically configured to: determine that the UE needs to be transitioned to the idle mode, and send a connection release request to an access network based on the second information, to request to release a connection of the UE; or determine that the UE needs to be transitioned to the connected mode, and send a paging message to an access network based on the second information, to request to establish a connection of the UE; or determine that the UE needs to activate a session, and trigger a session activation procedure based on the second information.

In a possible implementation, the second information includes current location information of the UE, and the processor 113 is specifically configured to: determine a paging range of the UE based on the current location information of the UE; and send a paging message to an access network within the determined paging range, to request to establish a connection of the UE.

In a possible implementation, the second information includes the location information of the UE at the preset time point or in the preset time period, and the processor 113 is specifically configured to: determine, at the preset time point or in the preset time period, a paging range of the UE based on the location information of the UE at the preset time point or in the preset time period; and send a paging message to an access network within the determined paging range, to request to establish a connection of the UE.

In actual application, the transceiver 111 is further configured to send the current state information of the UE to the NWDA function entity, where the state information includes the connected mode or the idle mode.

The CPF entity provided in this embodiment can perform a function performed by the CPF entity (for example, an MME, an AMF, or an SMF) in the foregoing method embodiments. An implementation principle and a technical effect of the CPF entity are similar to those of the method embodiment. Details are not described herein again.

In addition, an embodiment of this application provides a plurality of mobile network optimization processing systems.

A first mobile network optimization processing system includes UE, an NWDA function entity having the mobile network optimization processing apparatus provided in the embodiment shown in FIG. 8, and a CPF entity having the mobile network optimization processing apparatus provided in the embodiment shown in FIG. 9.

A second mobile network optimization processing system includes UE, the NWDA function entity provided in the embodiment shown in FIG. 10, and the CPF entity provided in the embodiment shown in FIG. 11.

Method or algorithm steps described in combination with the content disclosed in this application may be implemented by hardware, or may be implemented by a processor by executing a software instruction, or may be implemented by a computer program product. The software instruction may include a corresponding software module. The software module may be located in a RAM memory, a flash memory, a ROM memory, an EPROM memory, an EEPROM memory, a register, a hard disk, a removable hard disk, a CD-ROM, or any other form of storage medium known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in UE. Certainly, the processor and the storage medium may exist in the UE as discrete components.

Persons skilled in the art should be aware that, in the foregoing one or more examples, functions described in this application may be implemented by hardware, software, firmware, or any combination thereof. When this application is implemented by software, the functions may be stored in a computer readable medium or transmitted as one or more instructions or code in the computer readable medium. The computer readable medium includes a computer storage medium and a communications medium. The communications medium includes any medium that enables a computer program to be transmitted from one place to another. The storage medium may be any available medium accessible to a general-purpose or dedicated computer.

In the several embodiments provided in this application, it should be understood that the disclosed system, device, and method may be implemented in other manners without departing from the scope of this application. For example, the described embodiments are merely examples. For example, the module or unit division is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all of the modules may be selected based on actual needs to achieve the objectives of the solutions of the embodiments. Persons of ordinary skill in the art may understand and implement the embodiments of this application without creative efforts.

In addition, the schematic diagrams illustrating the system, device, method and different embodiments may be combined or integrated with other systems, modules, technologies, or methods without departing from the scope of this application. In addition, the displayed or discussed mutual couplings or direct couplings or communication connections may be implemented by using some interfaces. The indirect couplings or communication connections between the apparatuses or units may be implemented in electronic, mechanical, or other forms.

It may be understood that, "a plurality of" in the embodiments of this application is two or more than two. Descriptions such as "first" and "second" in the embodiments of this application are merely used for indicating and distinguishing between objects, do not show a sequence, do not represent that the embodiments of this application specifically limit a quantity of devices, and do not constitute any limitation on the embodiments of this application.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A mobile network optimization processing method, comprising:
   obtaining, by a network data analytics (NWDA) function entity, first information indicating location information and moving track information of a user equipment (UE), the UE being a mobile end user device operating according to one of a connected mode or an idle mode;
   determining, by the NWDA function entity, second information comprising service state transition location information for the UE at a preset time point or in a preset time period based at least on the location information and the moving track information of the first information; and
   sending the second information by the NWDA function entity to a control plane function entity, thereby causing the control plane function entity to perform service state transition optimization processing on the UE to direct transitioning of the UE from one of the idle mode or the connected mode to the other of the idle mode or the connected mode based on the second information.

2. The method according to claim 1, wherein the obtaining, by an NWDA function entity, first information comprises at least one of the following operations:
   obtaining, by the NWDA function entity, the first information reported by the UE;

obtaining, by the NWDA function entity, the first information reported by an access network (AN);
obtaining, by the NWDA function entity, the first information reported by an application function (AF) entity; and
obtaining, by the NWDA function entity, the first information reported by a network function (NF) entity.

3. The method according to claim 1, wherein the second information further comprises service state transition time information for performing optimization processing on the UE, which comprises at least one of the following elements:
a time at which the UE enters the idle mode; or
a time at which the UE enters the connected mode; or
a time of establishing a service that causes a state change of the UE; or
a time of ending a service that causes a state change of the UE.

4. The method according to claim 1, wherein the first information further comprises service information of the UE, and the determining, by the NWDA function entity, second information based on the first information comprises:
determining, by the NWDA function entity based on the service information of the UE, the service state transition location information for the UE.

5. The method according to claim 1, wherein before the determining, by the NWDA function entity, second information based on the first information, the method further comprises:
receiving, by the NWDA function entity, current state information of the UE that is sent by the control plane function entity, wherein the state information comprises the connected mode or the idle mode.

6. A mobile network optimization processing apparatus, comprising:
a processor; and
a memory coupled to the processor and having program instructions stored thereon which, when executed by the processor, cause the apparatus to perform operations comprising:
obtaining first information indicating location information and moving track information of a user equipment (UE), the UE being a mobile end user device operating according to one of a connected mode or an idle mode;
determining second information comprising service state transition location information for the UE at a preset time point or in a preset time period based at least on the location information and the moving track information of the first information; and
sending, to a control plane function entity, the second information, thereby causing the control plane function entity to perform service state transition optimization processing on the UE to direct transitioning of the UE from one of the idle mode or the connected mode to the other of the idle mode or the connected mode based on the second information.

7. The apparatus according to claim 6, wherein the operations further comprise at least one of the following operations:
obtaining, the first information reported by the UE;
obtaining, the first information reported by an access network (AN);
obtaining, the first information reported by an application function (AF) entity; and
obtaining, the first information reported by a network function (NF) entity.

8. The apparatus according to claim 6, wherein the second information further comprises service state transition time information for performing optimization processing on the UE, which comprises at least one of the following elements:
a time at which the UE enters the idle mode; or
a time at which the UE enters the connected mode; or
a time of establishing a service that causes a state change of the UE; or
a time of ending a service that causes a state change of the UE.

9. The apparatus according to claim 6, wherein the first information further comprises service information of the UE, and the operations further comprise:
determining, based on the service information of the UE, the service state transition location information for the UE.

10. The apparatus according to claim 6, wherein the operations further comprise:
receiving, current state information of the UE that is sent by the control plane function entity, wherein the state information comprises the connected mode or the idle mode.

11. A mobile network optimization processing system, comprising, a control plane function entity, and a network data analytics (NWDA) function entity, wherein the NWDA function entity is configured to:
obtain first information indicating location information and moving track information of a user equipment (UE), the UE being a mobile end user device operating according to one of a connected mode or an idle mode;
determine second information comprising service state transition location information for the UE at a preset time point or in a preset time period based at least on the location information and the moving track information of the first information; and
send, to a control plane function entity, the second information, thereby causing the control plane function entity to perform service state transition optimization processing on the UE to direct transitioning of the UE from one of the idle mode or the connected mode to the other of the idle mode or the connected mode based on the second information.

12. The system according to claim 11, wherein the NWDA function entity is configured to obtain the first information by at least one of the following operations:
obtaining, by the NWDA function entity, the first information reported by the UE;
obtaining, by the NWDA function entity, the first information reported by an access network (AN);
obtaining, by the NWDA function entity, the first information reported by an application function (AF) entity; and
obtaining, by the NWDA function entity, the first information reported by a network function (NF) entity.

13. The system according to claim 11, wherein the second information further comprises service state transition time information for performing optimization processing on the UE, which comprises at least one of the following elements:
a time at which the UE enters the idle mode; or
a time at which the UE enters the connected mode; or
a time of establishing a service that causes a state change of the UE; or
a time of ending a service that causes a state change of the UE.

14. The system according to claim 11, wherein the first information further comprises service information of the UE, and the NWDA function entity is configured to determine the second information based on the first information by:

determining, based on the service information of the UE, the service state transition location information for the UE.

15. The system according to claim 11, wherein before the NWDA function entity determines the second information based on the first information, the NWDA function entity is further configured to:
receive current state information of the UE that is sent by the control plane function entity, wherein the state information comprises the connected mode or the idle mode.

16. The method according to claim 1, wherein the sending the second information by the NWDA function entity to a control plane function entity, thereby causing the control plane function entity to perform service state transition optimization processing on the UE to direct transitioning of the UE from one of the idle mode or the connected mode to the other of the idle mode or the connected mode based on the second information comprises at least one of:
instructing the UE to transition from the connected mode to the idle mode;
instructing the UE to transition from the idle mode to the connected mode;
directing establishing a service such that the UE transitions from the idle mode to the connected mode; or
directing ending a service such that the UE transitions from the connected mode to the idle mode.

17. The method according to claim 1, wherein the second information further comprises service state transition indication information, which comprises at least one of the following elements:
an indication that the UE enters the idle mode; or
an indication that the UE enters the connected mode; or
an indication of establishing a service that causes a state change of the UE; or
an indication of ending a service that causes a state change of the UE.

18. The apparatus according to claim 6, wherein the second information further comprises service state transition indication information, which comprises at least one of the following elements:
an indication that the UE enters the idle mode; or
an indication that the UE enters the connected mode; or
an indication of establishing a service that causes a state change of the UE; or
an indication of ending a service that causes a state change of the UE.

19. The system according to claim 11, wherein the second information further comprises service state transition indication information, which comprises at least one of the following elements:
an indication that the UE enters the idle mode; or
an indication that the UE enters the connected mode; or
an indication of establishing a service that causes a state change of the UE; or
an indication of ending a service that causes a state change of the UE.

\* \* \* \* \*